Nov. 25, 1941.  A. E. KIMBERLY, JR  2,263,996
FLUID COUPLING
Filed Feb. 6, 1939  2 Sheets-Sheet 1
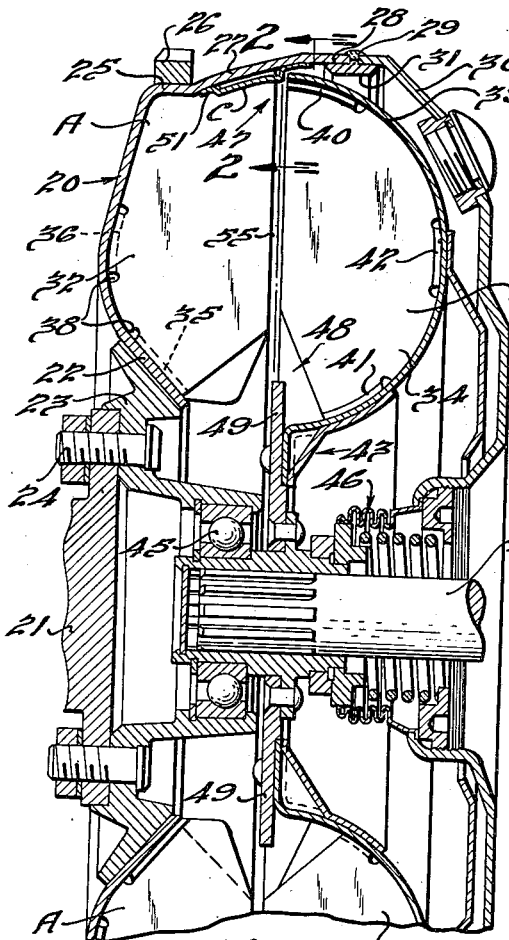
Fig. 1.
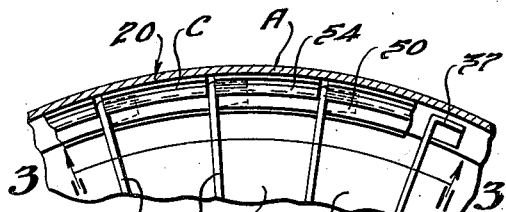
Fig. 2.
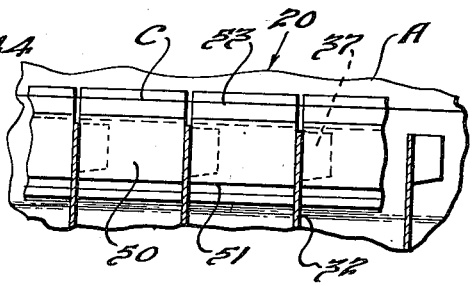
Fig. 3.
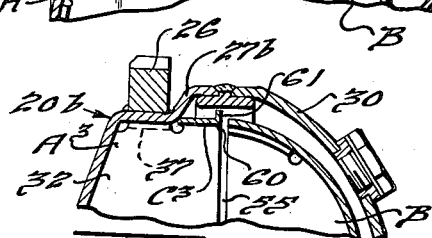
Fig. 11.
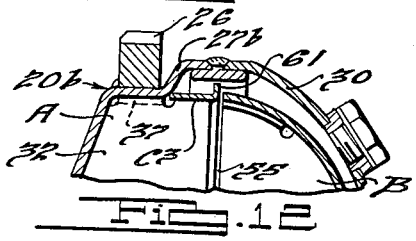
Fig. 12.
Fig. 4.
INVENTOR
Albert E. Kimberly, Jr.
BY
Harness, Dind, Patee & Harris
ATTORNEYS.

Nov. 25, 1941.    A. E. KIMBERLY, JR    2,263,996
FLUID COUPLING
Filed Feb. 6, 1939    2 Sheets-Sheet 2
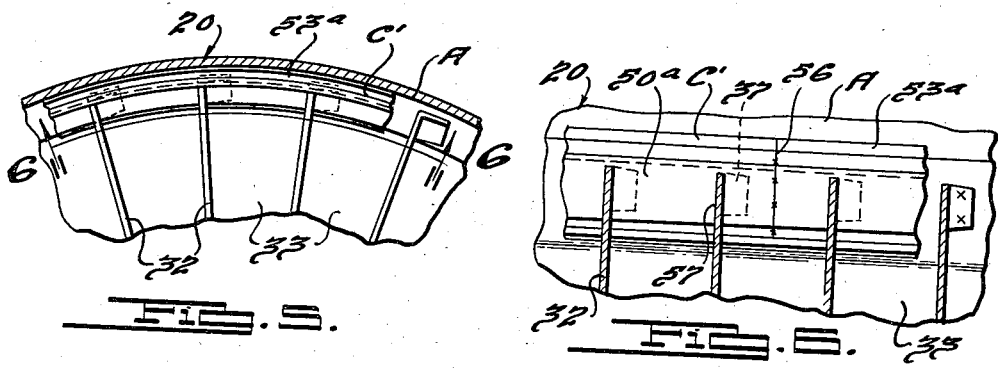
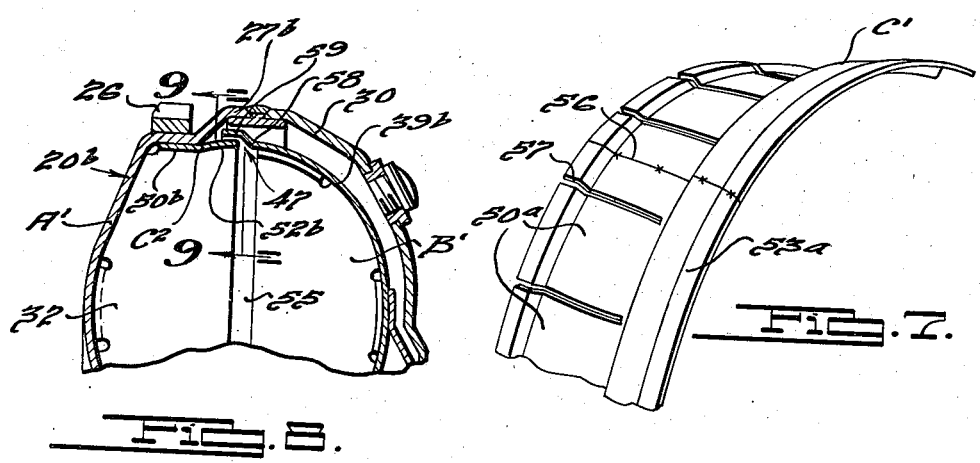
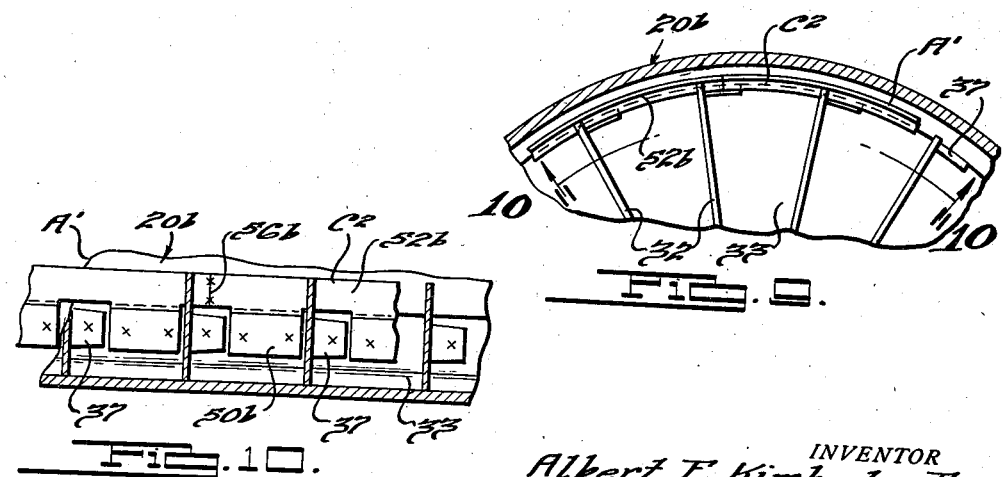
INVENTOR
Albert E. Kimberly, Jr.
BY
Harness, Dickey, Pierce & Harris
ATTORNEYS Patented Nov. 25, 1941

2,263,996

UNITED STATES PATENT OFFICE 2,263,996

FLUID COUPLING

Albert E. Kimberly, Jr., Detroit, Mich., assignor to Chrysler Corporation, Highland Park, Mich., a corporation of Delaware Application February 6, 1939, Serial No. 254,836

9 Claims. (Cl. 60—54)

This invention relates to fluid couplings of the well known type used to transmit rotary motion between two members which carry the cooperating parts of the coupling.

My invention is particularly related to fluid couplings of the kinetic type and while my invention relates particularly to fabricated or stamped coupling structures it is not necessarily limited thereto in its broader aspects.

One object of my invention is to provide a fluid coupling having improved running efficiency especially at driving speeds where a minimum of slip in the drive transmission is desired.

Another object is to provide a fluid coupling capable of transmitting greater torque for its size or capacity at a given speed or in other words to bring about an increase in the torque transmitting capacity of the coupling and decrease in the stall point of the coupling characteristic.

A further object is to provide a coupling which develops less heat during normal running than has heretofore been experienced with couplings of the same general capacity under similar conditions of use.

A still further object of my invention is to provide a fluid coupling so constructed as to guard against loss of energy of the high velocity fluid at the transfer zone between the driving member or impeller and the driven member or runner.

Heretofore it has been most common to construct the coupling impeller, and most frequently the runner as well, of a metal casting. Such fluid couplings may be conveniently made with housing attached to the impeller or runner without incurring loss of the high velocity fluid at the transfer zone to the extent which has been experienced with couplings fabricated from sheet metal. The latter type of couplings are preferred in quantity production, such as in automotive use, and also for general use because of the great saving in weight and cost and also to obtain uniformity and increase in strength. Cast couplings are further objectionable due to inherent porosity of the metal requiring relatively heavy castings which, in turn, gives rise to high inertia and centrifugal force characteristics producing sluggish action and bursting forces of dangerous magnitude.

Where stamped couplings are employed it is generally desirable to fabricate the housing as an extension of one of the coupling members, preferably the impeller, and because of the stamping die draft and the increased diameter of the housing at the zone of high velocity fluid transfer, the resulting structure is such that much of the fluid tends to escape from the impeller directly to the space between the runner and housing where its energy is lost, insofar as runner operation is concerned, in the form of heat and rise in pressure within the housing.

My invention embodies means which may take the form of a deflector element preferably attached to the impeller at the high velocity transfer zone and so arranged as to guide the fluid in an efficient manner toward the runner insuring against appreciable escape of the high velocity fluid and otherwise accomplishing the aforesaid objects of my invention.

I have discovered that the terminal direction of the fluid leaving the impeller bears a very critical relationship to the coupling characteristics.

While my invention may assume a variety of forms, I have illustrated several embodiments in the accompanying drawings, in which:

Fig. 1 is a sectional elevational view through a fluid coupling illustrating my invention incorporated therewith.

Fig. 2 is a fragmentary sectional elevational view taken as indicated by line 2—2 of Fig. 1.

Fig. 3 is a further view taken as indicated by line 3—3 of Fig. 2.

Fig. 4 is a perspective view of one of the deflector elements.

Fig. 5 is a view corresponding to Fig. 2 but illustrating a modification in which the deflectors are formed as a unitary structure.

Fig. 6 is a detail view taken as indicated by line 6—6 of Fig. 5.

Fig. 7 is a perspective view of a portion of the deflector incorporated in the Fig. 5 coupling.

Fig. 8 is a fragmentary view of a coupling of the Fig. 1 type but illustrating another modification of my invention.

Fig. 9 is a fragmentary view taken as indicated by line 9—9 of Fig. 7.

Fig. 10 is a sectional view taken as indicated by line 10—10 of Fig. 9.

Fig. 11 is a detail view of a coupling of the Fig. 1 type illustrating another form of my invention.

Fig. 12 is a view similar to Fig. 11 but showing a modification thereof.

Referring to the drawings, I have illustrated in Fig. 1 a fluid coupling of a stamped fabricated construction of the general type disclosed in the copending application of Neracher et al., Serial No. 214,002, filed June 16, 1938. This coupling comprises an impeller structure A formed of a stamped dished cover 20 mounted on the driving crankshaft member 21 as by welding the inner portion 22 to a hub 23 connected at 24 to member 21.

The cover 20 is so shaped in stamping as to provide an annular shoulder 25 for seating a starting ring gear 26, where the coupling is used in automotive installations. The cover stamping then extends axially in enlarging diameter at the flared portion 27 and may terminate at 28 for welding at 29 with the housing extension in the form of a stamping 30 which thereby forms a structural extension of cover 20 and cooperates therewith to enclose the runner structure B. The portion 27 merges the housing 30 with the cover 20 and facilitates operation of the stamping die in forming the cover as will be readily understood. If desired, an annular band 31 may bridge the weld 29 as a part thereof to reinforce the connection and prevent the welding flux and spatter from falling into the coupling housing.

The impeller A has the radially extending stamped vanes 32 spaced circumferentially to form the fluid passages 33 wherein the fluid is guided for projection toward corresponding passages formed by vanes 34 of runner B. Each vane 32 has a plurality of tongues deflected therefrom as at 35, 36, 37 respectively shaped to lie against the inner, intermediate, and outer portions of cover 20 and welded thereto. The outer terminal tongues 37 engage the portion 27 adjacent shoulder 25. In order to facilitate bending of the tongues the vanes may be notched adjacent the tongues as at 38.

The runner B is likewise formed of a stamped dished cover 39 to which the terminal and intermediate tongues 40, 41 and 42 of the vanes 34 are welded. The runner has a fabricated hub assembly generally designated at 43 fixed to a driven shaft 44 journalled at 45 in hub 23. A running seal 46 operates between housing 30 and the hub 43 to prevent escape of the fluid medium from the coupling.

The coupling, as thus far described, is generally similar to that disclosed in the aforesaid application and in operation the impeller rotation causes the fluid to be circulated outwardly in passages 33 for transfer at the zone 47 of high fluid velocity toward the passages of the runner where the kinetic energy of the fluid causes the runner to be driven with slip rapidly decreasing as the impeller speed increases from rest. The fluid returns from the runner passages to the impeller passages at the zone 48 of low fluid velocity for recirculation. If desired, a baffle 49 may be incorporated at zone 48 having known properties of increasing the slip at very low impeller speed without affecting slip at high speeds when high efficiency of power transmission is desired.

With a fluid coupling constructed as aforesaid, the high velocity fluid escapes in quantity at zone 47 from passages 33 into the space between runner cover 39 and housing 30 and in order to prevent this escape, I provide means at this zone to impart a directional effect to the fluid leaving the impeller such that the fluid will be guided to the runner passages. One form of this means is illustrated in Figs. 1-4 and comprises a plurality of stamped deflector members C, one being provided for each passage 33 of the impeller.

Each deflector C comprises a body portion 50 terminating at one end in an outwardly offset shoulder 51 for welding to cover portion 27 adjacent a tongue 37, the length circumferentially of the deflector being such as to fit between adjacent vanes 32. The portion 50 engages the tongue 37 and is so shaped, especially at its fluid discharge portion 52 adjacent the offset shoulder 53 as to deflect the fluid at zone 47 to insure entry thereof into the runner vane passages. The shoulder 53 is offset at 54 from portion 52 and is shaped to fit the cover portion 27 and is welded thereto axially overlying the outer end of the runner cover 39. If the tongues 37 are located inwardly of outer ends of vanes 32 then, if desired, the body portions 51, 52 of deflector C may be merged smoothly without the shouldered offset. I have found however that such a shoulder does not appreciably disturb or adversely affect the fluid circulation and therefore I prefer to provide the terminal tongues 37 for supporting the vanes at their outer ends.

When the deflectors C are assembled in the various passages 33, the fluid discharged from the impeller A at the zone will be deflected and guided toward the passages of the runner B without appreciable loss. The offset 54 is located as closely as practicable to the entry portions of the runner passages and in Fig. 1 the terminal portion 52 partially closes the gap 55 between the impeller and runner.

Instead of forming the deflectors C as separate stampings, these deflectors may be formed as an integral strip, rolled after stamping and then welded to provide a continuous ring. I have illustrated such arrangement in Figs. 5–7 wherein the shoulder 53$^a$ is a continuous ring formed by welding at 56, the individual deflector bodies 50$^a$ being integral therewith and having slots 57 to receive the vanes 32. On assembly in the Fig. 1 coupling by welding to cover portion 27, the Fig. 7 deflector C$^1$ would appear in section just like deflector C in Fig. 1.

In Figs. 8–10 the impeller A$^1$ has its cover 20$^b$ flared at 27$^b$ generally as before although in this modification, the cover 39$^b$ of runner B$^1$ is extended at 58 across gap 55 and then enlarged at 59 in telescoping relation with the discharge end of the impeller. The continuous deflector C$^2$ now has its body portions 50$^b$ of less width than the passages 33 so as to lie adjacent the tongues and welded to cover 20$^b$. The terminal fluid guiding portion 52$^b$ is continuous, being welded at 56$^b$ as shown in Fig. 10, and overlies the outer ends of the impeller vanes 32 within cover extension 59. The fluid is deflected and guided at zone 47 as before.

Referring to the embodiment in Fig. 11, the runner B of Fig. 1 is combined with the impeller A$^3$ substantially similar to impeller A$^1$ of Fig. 8 but now the continuous deflector ring C$^3$ is not welded to the impeller cover 20$^b$ but instead is in the form of a simple ring without slots or projections (such as at 57 and 50$^b$ aforesaid). This ring is fitted around the outer ends of the impeller vanes 32 and is welded thereto at 60, the ring having a stiffener flange 61 adjacent its fluid discharge boundary. At its opposite boundary the ring is brought against the cover 20$^b$ adjacent the flare 27$^b$ to prevent fluid escape at this point.

Fig. 12 is similar to the Fig. 11 arrangement but has the deflector ring C$^4$ extended to partially project across the gap 55 so that the fluid discharge from the impeller vane passages is very close to the inlet portions of the runner vane passages.

I do not limit my invention, in the broader aspects thereof, to any particular combination and arrangement of parts such as shown and described for illustrative purposes since various modifications will be apparent from the teachings of my invention and scope thereof as defined in the appended claims.

I claim:

1. A drive transmitting fluid coupling having relatively rotatable coaxial impeller and runner structures each comprising a plurality of vanes extending outwardly with respect to said axis to provide a plurality of fluid conducting passages, the vanes of said structures being so disposed as to provide a zone of high velocity fluid transfer from the impeller passages to the runner passages for transmitting drive from the impeller structure to the runner structure, said impeller structure having an annular dished cover carrying the vanes thereof and providing a boundary wall for a portion of each of the fluid conducting passages thereof remote from said fluid transfer zone, said cover having a portion of enlarging diameter adjacent said fluid transfer zone for receiving the runner structure therewithin, and a plurality of fluid deflectors carried by said impeller structure and respectively disposed between successive pairs of adjacent vanes thereof to provide a boundary wall for a portion of each of the fluid conducting passages thereof adjacent said fluid transfer zone for preventing the fluid from flowing along said cover portion by deflecting the fluid therefrom toward the runner passages, each of said deflectors having an intermediate fluid deflecting portion and end portions stepped therefrom in engagement with said cover.

2. A drive transmitting fluid coupling having relatively rotatable coaxial impeller and runner structures each comprising a plurality of vanes extending outwardly with respect to said axis to provide a plurality of fluid conducting passages, the vanes of said structures being so disposed as to provide a zone of high velocity fluid transfer from the impeller passages to the runner passages for transmitting drive from the impeller structure to the runner structure, the vanes of the impeller and runner structures being spaced from each other at said zone, said impeller structure having a cover carrying the vanes thereof and providing a boundary wall for a portion of each of the fluid conducting passages thereof remote from said zone, said cover having an extension portion of enlarging diameter adjacent said zone for receiving the runner structure spaced therewithin, and fluid deflector means carried by said impeller structure and providing a boundary wall for a portion of each of the fluid conducting passages thereof adjacent said zone for preventing the fluid from flowing along said cover portion by deflecting the fluid therefrom toward the fluid conducting passages of said runner structure, said deflector means extending across said space between the impeller and runner vanes and terminating in the space between said runner structure and said cover portion.

3. A drive transmitting fluid coupling having relatively rotatable coaxial impeller and runner structures each comprising a plurality of vanes extending outwardly with respect to said axis to provide a plurality of fluid conducting passages, the vanes of said structures being so disposed as to provide a zone of high velocity fluid transfer from the impeller passages to the runner passages for transmitting drive from the impeller structure to the runner structure, the vanes of the impeller and runner structures being spaced from each other at said zone, said impeller structure having a cover carrying the vanes thereof and providing a boundary wall for a portion of each of the fluid conducting passages thereof remote from said zone, said cover having a portion of enlarging diameter adjacent said zone for receiving the runner structure therewithin, and fluid deflector means carried by said impeller structure and providing a boundary wall for a portion of each of the fluid conducting passages thereof adjacent said zone for preventing the fluid from flowing along said cover portion by deflecting the fluid therefrom toward the fluid conducting passages of said runner structure, said runner having a cover carrying the vanes thereof and providing a boundary wall for each of the fluid conducting passages thereof adjacent said zone, said deflector means and said runner cover being relatively overlapped in the direction of said axis adjacent said zone.

4. A drive transmitting fluid coupling having relatively rotatable coaxial impeller and runner structures each comprising a plurality of vanes extending outwardly with respect to said axis to provide a plurality of fluid conducting passages, the vanes of said structures being so disposed as to provide a zone of high velocity fluid transfer from the impeller passages to the runner passages for transmitting drive from the impeller structure to the runner structure, said impeller structure having an annular dished cover carrying the vanes thereof and providing a boundary wall for a portion of each of the fluid conducting passages thereof remote from said fluid transfer zone, said cover having a portion of enlarging diameter adjacent said fluid transfer zone for receiving the runner structure therewithin, and an annular deflector ring carried by said impeller structure and having a plurality of circumferentially spaced tongues respectively disposed between successive pairs of adjacent vanes of the impeller structure, said tongues having their projecting end portions disposed to lie within, and in attached engagement with the inner surface of, said cover, said deflector ring providing a boundary wall for a portion of each of the fluid conducting passages of the impeller structure adjacent said zone for preventing the fluid from flowing along said cover portion by deflecting the fluid therefrom toward the fluid conducting passages of said runner structure.

5. A drive transmitting fluid coupling having relatively rotatable coaxial impeller and runner structures each comprising a plurality of vanes extending outwardly with respect to said axis to provide a plurality of fluid conducting passages, the vanes of said structures being so disposed as to provide a zone of high velocity fluid transfer from the impeller passages to the runner passages for transmitting drive from the impeller structure to the runner structure, said impeller structure having an annular dished cover carrying the vanes thereof and providing a boundary wall for a portion of each of the fluid conducting passages thereof remote from said fluid transfer zone, said cover having a portion of enlarging diameter adjacent said fluid transfer zone for receiving the runner structure therewithin, and an annular deflector ring carried by said impeller structure and having a plurality of circumferentially spaced tongues respectively disposed between successive pairs of adjacent vanes of the impeller structure, said tongues having their projecting end portions disposed to lie within, and in attached engagement with the inner surface of, said cover, the vanes of the impeller structure respectively fitting the spaces between the tongues of said deflector ring, said deflector ring providing a boundary wall for a portion of each of the fluid conducting passages of the impeller structure adjacent said zone for preventing the fluid from flowing along said cover portion by deflecting the fluid therefrom toward the fluid conducting passages of said runner structure.

6. A drive transmitting fluid coupling having relatively rotatable coaxial impeller and runner structures each comprising a plurality of vanes extending outwardly with respect to said axis to provide a plurality of fluid conducting passages, the vanes of said structures being so disposed as to provide a zone of high velocity fluid transfer from the impeller passages to the runner passages for transmitting drive from the impeller structure to the runner structure, said impeller structure having an annular dished cover carrying the vanes thereof and providing a boundary wall for a portion of each of the fluid conducting passages thereof remote from said fluid transfer zone, said cover having a portion of enlarging diameter adjacent said fluid transfer zone for receiving the runner structure therewithin, and an annular deflector ring overlying terminal portions of the vanes of said impeller structure and having a plurality of circumferentially spaced tongues respectively extending between the impeller vanes and secured to said cover, said deflector ring preventing the fluid from flowing along said cover portion by deflecting the fluid therefrom toward the fluid conducting passages of said runner structure at said zone.

7. A fluid coupling having impeller and runner members each comprising a cover structure and a plurality of vanes extending therefrom to provide fluid conducting passages for the circulation of a fluid medium between said members, the vanes of said impeller member each having a tongue deflected therefrom and disposed in face contact with the inner surface of the impeller cover structure for securing these vanes to the impeller cover structure adjacent the discharge portions of the impeller passages, and fluid deflecting means secured to said impeller member for deflecting the fluid from the impeller cover structure toward the inlet portions of the runner passages, said tongues being disposed to lie between said fluid deflecting means and said impeller cover structure.

8. A fluid coupling having impeller and runner member each comprising a cover structure and a plurality of vanes extending therefrom to provide fluid conducting passages for the circulation of a fluid medium between said members, the vanes of said impeller member each having a tongue deflected therefrom for securing these vanes to the impeller cover structure adjacent the discharge portions of the impeller passages, and fluid deflecting means secured to said impeller member adjacent said tongues for deflecting the fluid from the impeller cover structure toward the inlet portions of the runner passages, said fluid deflecting means comprising deflecting surfaces respectively extending between adjacent pairs of vanes of the impeller member, the tongues being disposed between said impeller cover structure and said deflecting surfaces respectively.

9. A fluid coupling having impeller and runner members each comprising a cover structure and a plurality of vanes extending therefrom to provide fluid conducting passages for the circulation of a fluid medium between said members, the vanes of said impeller member each having a tongue deflected therefrom for securing these vanes to the impeller cover structure adjacent the discharge portions of the impeller passages, and fluid deflecting means secured to said impeller member adjacent said tongues for deflecting the fluid from the impeller cover structure toward the inlet portions of the runner passages, said fluid deflecting means comprising deflecting surfaces respectively extending between adjacent pairs of vanes of the impeller member, the tongues being disposed adjacent and spaced circumferentially relatively to bounding edges of said deflecting surfaces respectively.

ALBERT E. KIMBERLY, Jr.